United States Patent
Nakamura et al.

(10) Patent No.: US 7,482,995 B2
(45) Date of Patent: Jan. 27, 2009

(54) CONTROL DEVICE FOR A PLURALITY OF DISPLAY DEVICES

(75) Inventors: Mika Nakamura, Hirakata (JP); Hiroshi Suenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 843 days.

(21) Appl. No.: 11/136,435

(22) Filed: May 25, 2005

(65) Prior Publication Data

US 2006/0007052 A1    Jan. 12, 2006

(30) Foreign Application Priority Data

Jun. 23, 2004    (JP) .............................. 2004-184716

(51) Int. Cl.
    *G09G 5/00*    (2006.01)
(52) U.S. Cl. ........................................ 345/3.1; 345/1.1
(58) Field of Classification Search ........... 345/1.1–3.3, 345/87–98, 103, 690, 502, 698; 348/458, 348/524, 569
See application file for complete search history.

(56) References Cited

U.S. PATENT DOCUMENTS

| | | | | |
|---|---|---|---|---|
| 5,579,057 A | * | 11/1996 | Banker et al. ............... 348/589 |
| 5,592,187 A | * | 1/1997 | Zenda ......................... 345/3.2 |
| 5,699,076 A | * | 12/1997 | Tomiyasu .................... 345/103 |
| 5,929,924 A | * | 7/1999 | Chen ........................... 348/552 |
| 5,956,046 A | * | 9/1999 | Kehlet et al. ................. 345/502 |
| 6,043,798 A | * | 3/2000 | Yamamoto et al. ........... 345/1.1 |
| 6,049,316 A | * | 4/2000 | Nolan et al. ................. 345/698 |
| 7,317,461 B2 | * | 1/2008 | Uchida et al. ............... 345/690 |
| 2004/0075621 A1 | * | 4/2004 | Shiuan et al. ................. 345/1.1 |

FOREIGN PATENT DOCUMENTS

JP    6-292200    10/1994

* cited by examiner

*Primary Examiner*—Nitin Patel
(74) *Attorney, Agent, or Firm*—Wenderoth, Lind & Ponack, L.L.P.

(57) ABSTRACT

A data transfer controller for transferring display data to N individual (where N is an integer, N≧2) display devices is disclosed. The data transfer controller includes a clock signal generating means, and a timing control means. The clock signal generating means generates clock signals. The timing control means adjusts the timing of the vertical synchronization signals included in the display data based on the clock signal for N individual display devices. The timing control means adjusts the timing of the vertical synchronization signals such that no vertical blanking period overlaps any other vertical blanking period, or adjusts the timing of the vertical synchronization signals such that no vertical display period overlaps a vertical display period of another display device among the display data transferred to each display device.

8 Claims, 14 Drawing Sheets

CONTROL DEVICE FOR A PLURALITY OF DISPLAY DEVICES

BACKGROUND OF THE INVENTION

1. Field of the Invention

The present invention relates to a data transfer controller for controlling the timing for transferring display data to a plurality of display devices.

2. Background Information

In recent years there has been an increase in electronic devices provided with a display device, such as portable telephones and on-board AV devices and the like. These electronic devices are provided with a data transmission controller for controlling the timing for transmitting display data, and a data transmission device for transmitting the display data in order to display the display data such as images and the like on a display device.

FIG. 11 shows an example of a system for transferring display data to a single display device. The system of FIG. 11 is configured by a data transfer controller 501, memory 502, data transfer device 503, and a single display device 504. The data transfer controller 501 outputs the vertical synchronization signal of the display data. The data transfer device 503 transfers display data to the display device 504 based on the vertical synchronization signals from the data transfer controller 501. The transferred display data are received by a data receiver 541 provided in the display device 504, and are displayed on the display device 504.

Electronic devices have become diversified in recent years, and electronic devices provided with a plurality of display devices 601a~c have especially proliferated, as shown in FIG. 12.

Japanese Laid-Open Patent Publication No. 06-292200 discloses a data transfer device corresponding to each of a plurality of display devices in order to transfer display data to a plurality of display devices. FIG. 13 shows an example of the system of Japanese Laid-Open Patent Publication No. 06-292200. Specifically, data transfer devices 703a~c are provided in correspondence with the display devices 704a~c. The data transfer controller 701 outputs the vertical synchronization signals of the display data to the data transfer devices 703a~c. The data transfer devices 703a~c transfer display data to the display devices 704a~c in synchronization with the vertical synchronization signals A, B, and C. This time the data transfer controller 701 transfers the same vertical synchronization signal to the respective data transfer devices 703a~c. Therefore, the timing for transferring display data to the display devices 704a~c is identical for all of the data transfer devices 703a~c.

In the method disclosed in Japanese Laid-Open Patent Publication No. 06-292200, all data transfer devices 703a~c simultaneously transfer display data to the respective display devices 704a~c, and simultaneously stop transferring display data. The power consumed by each data transfer device 703a~c during the transfer of display data (hereinafter referred to simply as "power consumption") is designated [P]. As shown in FIG. 14, in the period during which all data transfer devices 703a~c are simultaneously transferring display data, the total power consumption of the data transfer devices 703a~c is designated [3×P]. In the period during which all data transfer devices 703a~c simultaneously stop transferring display data, the total power consumption of the data transfer devices 703a~c is designated [0]. In this way the total power consumption fluctuation range can be described as 3×P−0=3×P.

Although the method disclosed in Japanese Laid-Open Patent Publication No. 06-292200 is suitable when displaying still images on a display device, it is unsuitable when displaying video images. When displaying video images, display data are updated with greater frequency than when displaying still images. Therefore, when displaying video images, the period during which display data are transferred must be shorter than when displaying still images. When shortening the period during which display data are transferred, the clock frequency for displaying the display data may be increased. Then, the pitch in the fluctuation of the power consumption of the data transfer devices 703a~c also increases due to the high speed of switching between the period during which display data are transferred and the period during which the display data transfer is stopped.

The fluctuation in power consumption of the data transfer devices 703a~c becomes power source noise of the power source used by the data transfer devices 703a~c. The power source noise also becomes noise in the transfer display data. Noise readily appears in display data particularly when the clock frequency is high as in the case of video images. This phenomenon must be considered particularly when display data are transferred by an AV device installed in an automobile because there is a possibility that the display data noise may adversely affect other automobile components such as the engine and brake systems and cause errors in operation.

The present invention controls the timing for transferring display data so as to reduce the power consumption of the data transfer device and suppress the previously mentioned fluctuation which causes noise in the display data.

In view of the above, there exists a need for a data transfer controller which overcomes the above mentioned problems in the prior art. This invention addresses this need in the prior art as well as other needs, which will become apparent to those skilled in the art from this disclosure.

SUMMARY OF THE INVENTION

In order to solve the previously described problems, a first aspect of the present invention provides a data transfer controller for controlling the timing for transferring display data to N individual (where N is an integer, N≧2) display devices. Specifically, the data transfer controller has a clock signal generating means and a timing control means. The clock signal generating means generates a clock signal. The timing control means adjusts the timing of the vertical synchronization signal included in the display data for each of N individual display devices based on the clock signal. Furthermore, the timing control means adjusts the timing of the vertical synchronization signals such that no vertical blanking period overlaps any other vertical blanking period, or adjusts the timing of the vertical synchronization signals such that no vertical display period overlaps a vertical display period of another display device among the display data transferred to each display device.

When a data transfer controller having this structure is used, it is possible to avoid generating periods in which all data transfer devices simultaneously stop transferring data to the display devices. Likewise, it is possible to avoid periods in which all data transfer devices are simultaneously transferring data to the display devices. When the power consumed by each data transfer device in transferring display data is designated [P], the fluctuation range of the total power consumption for data transfer can be reduced from N×P to (N−1)×P. Therefore, the power consumption of each data transfer device can be reduced and noise in the transferred display data is also reduced.

According to a second aspect of the present invention, the timing control means of the data transfer controller of the first aspect adjusts the timing of the vertical synchronization signals such that no vertical blanking period overlaps any other vertical blanking period, and no vertical display period overlaps a vertical display period of another display device among the display data transferred to each display device.

According to this structure, the maximum value of the total power consumption required for data transfer by the data transfer devices is less than when all data transfer devices simultaneously transfer data. Specifically, the total power consumption required for data transfer is (N−1)×P or less. Furthermore, the minimum value of total power consumption is greater than when all data transfer devices simultaneously stop data transfer. Specifically, the total power consumption required for data transfer is P or greater. Accordingly, since the fluctuation range of the total power consumption required for data transfer by the date transfer devices is at most (N−2)× P, power consumption is reduced, and the noise in the transferred display data is also reduced.

According to a third aspect of the present invention, the timing control means of the data transfer controller of the first or second aspects adjusts the timing of the vertical synchronization signal so as to switch the vertical blanking period of the display data transferred to each display device each period T/N obtained by dividing the cycle T of the vertical synchronization signal of the display data into N equal parts.

According to this structure, the periods in which the data transfer controller stops transferring data to each display device are staggered so as to not overlap. That is, one among the data transfer controllers stops the data transfer. Therefore, when the power consumed in data transfer by each data transfer device is designated P, then the total power consumption for data transfer is normally (N−1)×P. Accordingly, the power consumption of each data transfer device is reduced, and the noise in the transferred data is reduced.

According to a fourth aspect of the present invention, the data transfer controller of the first aspect is further provided with a transfer clock generating means for generating a transfer clock which defines the display data transfer speed.

In this structure, the display data are transferred based on the transfer clock. Thus, the transfer clock speed, that is, the transfer speed of the display data, can be changed in accordance with the conditions and environment of the display device. Therefore, the period in which data are transferred can be adjusted according to the condition of the display device.

According to a fifth aspect of the present invention, the data transfer controller of the fourth aspect further includes a transfer clock adjusting means for adjusting a frequency of the transfer clock such that no vertical blanking period overlaps any other vertical blanking period among the display data transferred to each display device.

According to this structure, the frequency of the transfer clock can be adjusted in accordance with the condition and environment of the display device. Thus, the period during which data are transferred can be adjusted according to the condition of the display device. Furthermore, it is possible to avoid generating periods in which all data transfer devices simultaneously stop transferring display data. Therefore, when the power consumed in transferring display data by each data transfer device is designated [P], the fluctuation range of the total power consumption in data transfer can be reduced from N×P to 1×P. Moreover, the power consumption of the data transfer devices is reduced and noise in the transferred display data is reduced.

According to a sixth aspect of the present invention, the data transfer controller of the fourth aspect further includes a transfer clock adjusting means which adjusts a frequency of the transfer clock such that the vertical blanking period of the display data transferred to each display device is switched each period T/N, and the respective lengths of the vertical blanking periods do not exceed the period T/N obtained by dividing the cycle Tv of the vertical synchronization signal of the display data into N equal parts.

According to this structure, the frequency of the transfer clock can be adjusted according to the condition and environment of the display device. Thus, the period during which display data are transferred can be adjusted according to the condition of the display device. Moreover, it is possible to avoid generating periods in which all data transfer devices simultaneously stop transferring display data. Thus, when the power consumed by each data transfer device in transferring display data is designated [P], the fluctuation range of the total power consumption for data transfer can be reduced from N×P to 1×P. Therefore, the power consumption of each data transfer device can be reduced and noise in the transferred display data is also reduced.

A seventh aspect of the present invention provides a mobile on-board video image transmission device connected to display devices. Specifically, the video image transmission device is a mobile on-board video image transmission device which includes the data transfer controller of the first aspect, a transmission means, and a memory. The transmission means transmits display data based on control signals generated by the data transfer controller. The memory stores the display data.

The data transfer controller of the first aspect suppresses noise in the transferred display data by reducing the total power consumption in transferring display data by all data transfer devices. Therefore, the data transfer controller of invention 1 may be applied to video image transmission devices such as between AV devices installed in automobiles. In this way noise in display data is safe because it does not adversely affect, for example, engine or brake devices.

The present invention reduces power consumption of data transfer devices, and controls the transfer timing of display data so as to suppress power consumption fluctuation. In this way the power supply of the data transfer device and noise in the display data can be reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

The present embodiment is described in detail hereinafter with reference to FIGS. 1 through 12.

First Embodiment (1) Structure (1-1) General Structure

Figure 1:
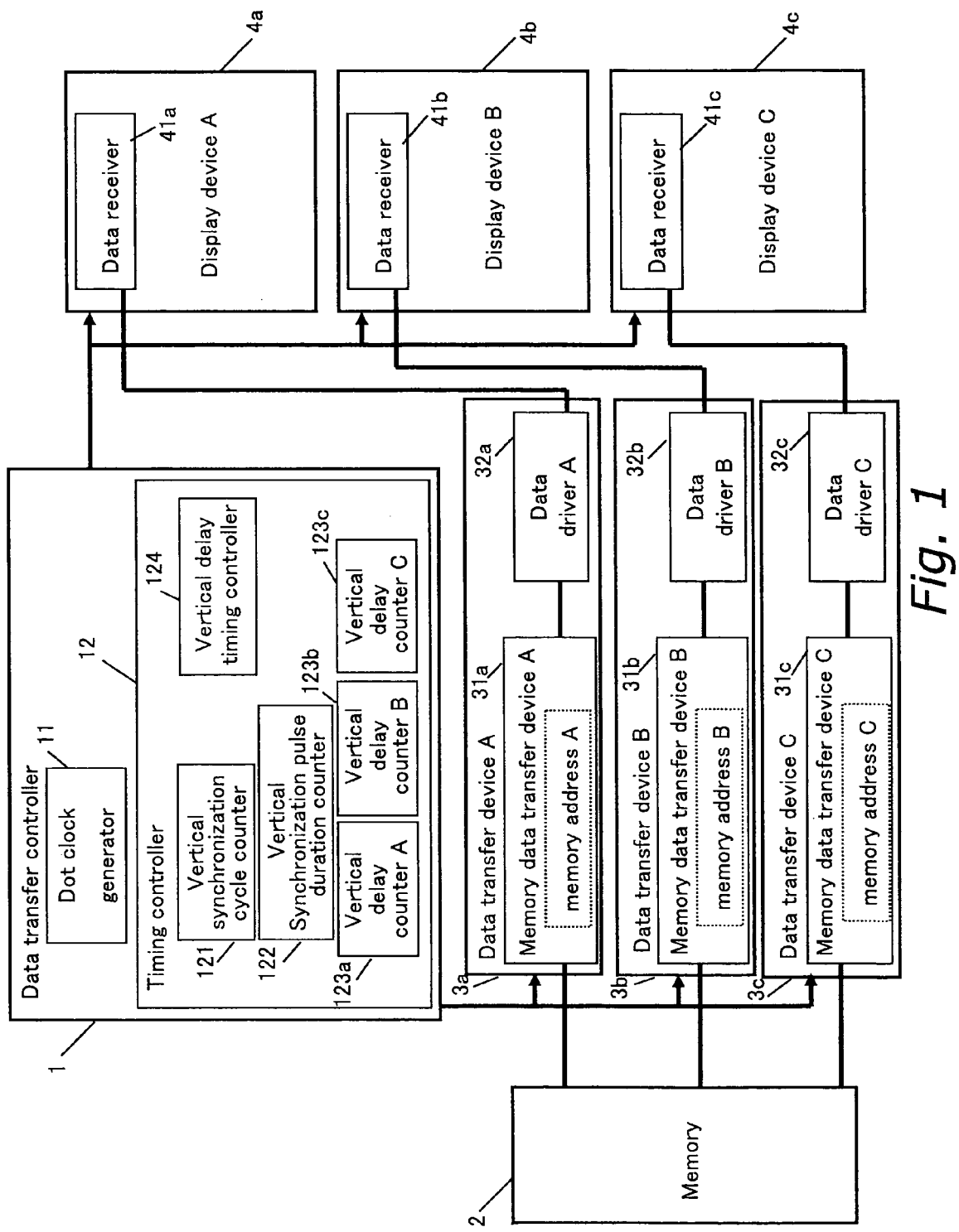
FIG. 1 is a structural diagram of the display data transfer system using the data transfer controller of the first embodiment.

FIG. 1 is a structural diagram of a display data transfer system using a data transfer controller of a first embodiment of the present invention. The display data transfer system of FIG. 1 includes a data transfer controller 1, memory 2, display devices 4*a~c*, and data transfer devices 3*a~c*. FIG. 1 assumes three display devices.

The data transfer controller 1 individually adjusts the timings for transferring display data to each respective display device 4*a~c*. The memory 2 stores the display data displayed by the display devices 4*a~c*. The data transfer devices 3*a~c* transmit the respective display data to the display devices 4*a~c* based on vertical synchronization signals supplied from the data transmission device 1. The display devices 4*a~c* output the display data transferred from the data transfer devices 3*a~c*. More specifically, each of the display devices 4*a~c* has a respective data receiver 41*a~c*. Each data receiver 41*a~c* receives display data transferred from a data transfer device 3*a~c*, and supplies the data to a display driver (not shown in the drawing).

Although there are three display devices in the present embodiment, the present invention is not limited to this number inasmuch as any number of display devices may be used. In this case, the data transfer devices are provided in equal number to the number of display devices.

(1-2) Data Transfer Controller

The data transfer controller 1 can be used as a control device for transferring images to a plurality of displays, for example, portable information devices such as portable phones and the like, dual monitors for personal computers, travel business terminals, rear seat monitors installed in vehicles and the like.

The data transfer controller 1 includes a dot clock generator 11 (equivalent to a clock signal generating means), and a timing controller 12. The dot clock generator 11 generates a dot clock (equivalent to a clock signal). The timing controller 12 supplies a vertical synchronization signal for each data transfer device 3*a~c*. The timing controller 12 adjusts each vertical synchronization signal such that all vertical synchronization signals (hereinafter referred to as vertical synchronization signal) supplied to the data transfer devices 3*a~c* are not simultaneous. The cycle of the vertical synchronization signals supplied to the data transfer devices 3*a~c*, the vertical blanking period, and vertical display period are determined based on the amount of data to be displayed by each display device, number of pixels, screen size, resolution and the like. The cycle of the vertical synchronization signals supplied to the data transfer devices 3*a~c*, vertical blanking period, and vertical display period are identical in the example of the present embodiment to facilitate the explanation.

Specifically, the timing controller 12 includes a vertical synchronization cycle counter 121, vertical synchronization pulse duration counter 122, vertical delay counters 123*a~c*, and vertical delay timing controller 124. The vertical synchronization cycle counter 121 generates the cycle of the vertical synchronization signal of the display data. The vertical synchronization pulse duration counter 122 generates the display period (equivalent to the vertical display period), and blanking period (equivalent to the vertical blanking period) of each vertical synchronization signal.

The vertical delay counters 123*a~c* delay each vertical synchronization signal a predetermined period from a predetermined standard timing. This predetermined period is determined for each display device by the vertical delay timing controller 124. Specifically, the vertical delay counter 123*a* delays the standard timing by a predetermined period TdA. The vertical delay counter 123*b* delays the standard timing by a predetermined period TdB. The vertical delay counter 123*c* delays the standard timing by a predetermined period TdC.

The vertical delay timing controller 124 adjusts the delay time of each vertical synchronization signal. In the present embodiment, the delay time is adjusted such that none of the vertical blanking periods overlaps another vertical blanking period among the display data transferred to the display devices, or none of the vertical display periods overlaps another vertical display period of another display device. This is described in detail later.

In this way, the data transfer controller 1 adjusts the timing for the transfer of display data.

Although not shown in the drawing, the data transfer controller 1 further includes a horizontal synchronization cycle counter and horizontal synchronization pulse duration counter. The horizontal synchronization cycle counter generates the cycle of the horizontal synchronization signal for the display data. The horizontal synchronization pulse duration counter generates the horizontal display period and horizontal blanking period of each vertical synchronization signal.

(1-3) Data Transfer Device

The respective data transfer devices 3*a~c* include respective memory data transfer devices 31*a~c*, and data drivers 32*a~c*. Each data transfer device 3*a~c* is provided for the associated display device 4*a~c*.

The memory data transfer devices 31*a~c* store memory addresses, and the display data are read from the memory 2 based on these memory addresses. The memory data transfer devices 31*a~c* transmit the read display data to the display devices 4*a~c* in accordance with the vertical synchronization signals from the timing controller 12.

The data drivers 32*a~c* drive the transfer data from the memory data transfer devices 31*a~c* to the display devices 4*a~c*.

(2) Vertical Synchronization Signal and Power Consumption

The influence of the vertical synchronization signals supplied from the data transfer controller 1 to the respective data transfer devices on the power consumption by the data transfer devices is discussed below.

Figure 2:
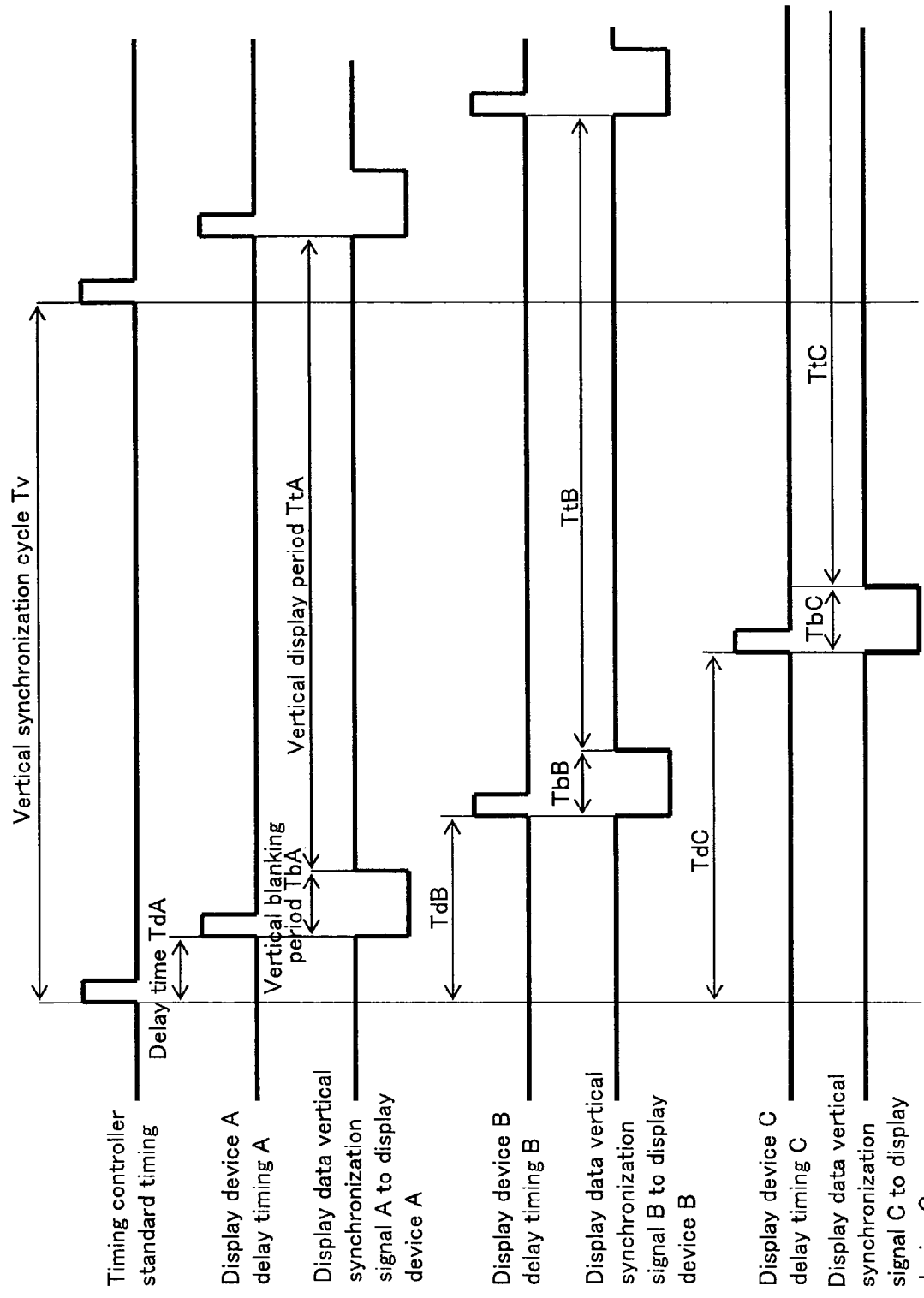
FIG. 2 is a timing chart of the vertical synchronization signals in the first embodiment.

FIG. 2 is a timing chart of the vertical synchronization signals in the present embodiment. The cycle, vertical blanking period, and vertical display period of each vertical synchronization signal is identical. To facilitate the following explanation, the vertical synchronization signals respectively supplied to the data transfer devices $3a\sim c$ are shown as vertical synchronization signal A~C.

In the present embodiment, vertical synchronization signal A is delayed by a time TdA from a predetermined standard timing. The vertical synchronization signal B is delayed a time TdB from the predetermined standard timing. The vertical synchronization signal C is delayed a time TdC from the predetermined standard timing. The delay times establish the relationship TdA<TdB<TdC. In this case, when the delay time TdA elapses after the standard timing, the vertical blanking period TbA starts for the vertical synchronization signal A. When the delay time TdB elapses after the standard timing, the vertical blanking period TbB starts for the vertical synchronization signal B. When the delay time TdC elapses after the standard timing, the vertical blanking period TbC starts for the vertical synchronization signal C.

Furthermore, the combined length of the delay time TdA and vertical blanking period TbA is shorter than the delay time TdB (TdA+TbA<TdB). The combined length of the delay time TdB and vertical blanking period TbB is shorter than the delay time TdC (TdB+TbB<TdC). The combined length of the delay time TdC and vertical blanking period TbC is shorter than the combined length of the delay time TdA and the vertical synchronization cycle Tv (TdC+TbC<TdA+Tv). The vertical blanking period TbA of the vertical synchronization signal A overlaps the vertical display periods TtB and TtC of the vertical synchronization signals B and C. The vertical blanking period TbB of the vertical synchronization signal B overlaps the vertical display periods TtA and TtC of the vertical synchronization signals A and C. The vertical blanking period TbC of the vertical synchronization signal C overlaps the vertical display periods TtA and TtB of the vertical synchronization signals A and B.

Therefore, none of the vertical blanking periods overlaps another vertical blanking period.

Figure 3:
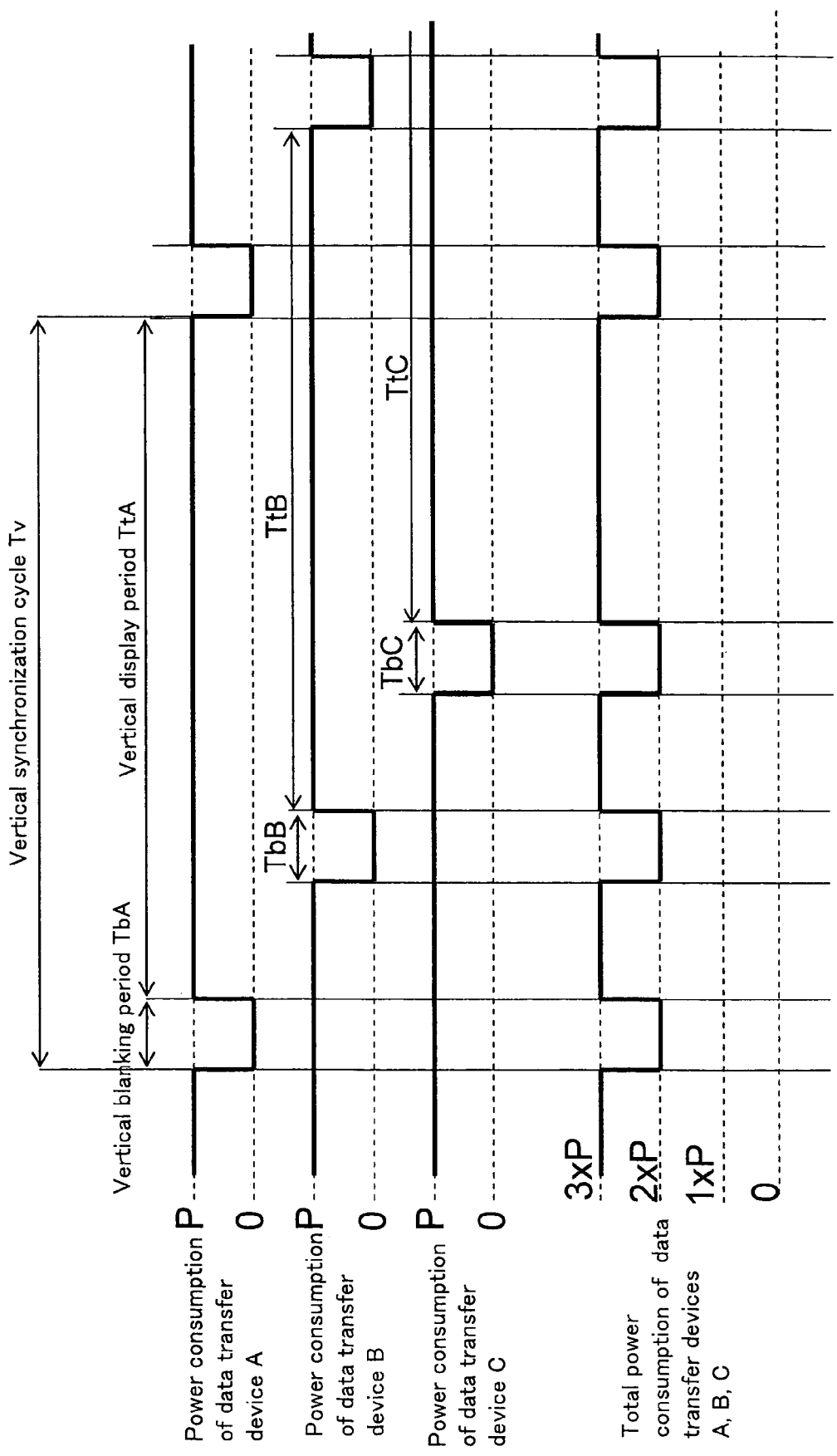
FIG. 3 is a timing chart of the power consumption by the data transfer devices using the vertical synchronization signals of the first embodiment.

FIG. 3 is a timing chart of power consumption by the data transfer devices $3a\sim c$ when the vertical blanking periods are adjusted as shown in FIG. 2. In the respective vertical display periods TtA~TtC, the data transfer devices $3a\sim c$ respectively consume power [P] to transfer data to the display devices $4a\sim c$. In the respective vertical blanking periods TbA~TbC, the data transfer devices $3a\sim c$ respectively consume power [0] because the data transfer is stopped.

Therefore, the total power consumed for data transfer by the data transfer devices $3a\sim c$, that is, the total power consumption of the data transfer devices $3a\sim c$, changes in a range from 2×P to 3×P. Specifically, in the blanking period Tb of any one vertical synchronization signal, the total power consumption of the data transfer devices is 2×P, and in the vertical display period Tt of all vertical synchronization signals, the total power consumption of the data transfer devices is 3×P.

In the present embodiment, therefore, the maximum total power consumption of the data transfer devices becomes 3×P, and the minimum total power consumption becomes 2×P. The difference between the maximum and minimum total power consumption, that is, the fluctuation range, becomes 3×P−2×P=1×P.

According to the present embodiment, it is possible to avoid generating a period in which all data transfer devices simultaneously stop data transfer to the display devices. Thus, when the power consumed by each data transfer device in transferring display data is designated [P], the fluctuation range of the total power consumption for data transfer can be reduced from 3×P to 2×P. Therefore, the power consumption of each data transfer device can be reduced and noise in the transferred display data and power source are also reduced.

Although the timing controller 12 adjusts the transfer timing such that no vertical blanking period overlaps another vertical blanking period in the present embodiment, alternatively, the timing controller 12 may also adjust the transfer timing such that no vertical display period overlaps another vertical display period. In this case, it is possible to avoid generating a period in which all data transfer devices simultaneously transfer data to the display devices. Thus, the maximum total power consumption is reduced from 3×P to 2×P. Accordingly, the fluctuation range of the power consumption of each data transfer device is reduced, and noise in the transferred data and power source are also reduced.

Although the present embodiment has been described in terms of three display devices, the present invention is applicable to N individual (where N is an integer, N≧2) display devices. In this case, the fluctuation range of the total power consumption of the data transfer devices is reduced from N×P to (N−1)×P.

Furthermore, the adjustment timing of the vertical synchronization signal is not limited to the example of the present embodiment.

Second Embodiment

The structure of the data transfer controller of the present embodiment, and the display data transfer system using this data transfer controller, are identical to the first embodiment.

(1) Vertical Synchronization Signal and Power Consumption

Figure 4:
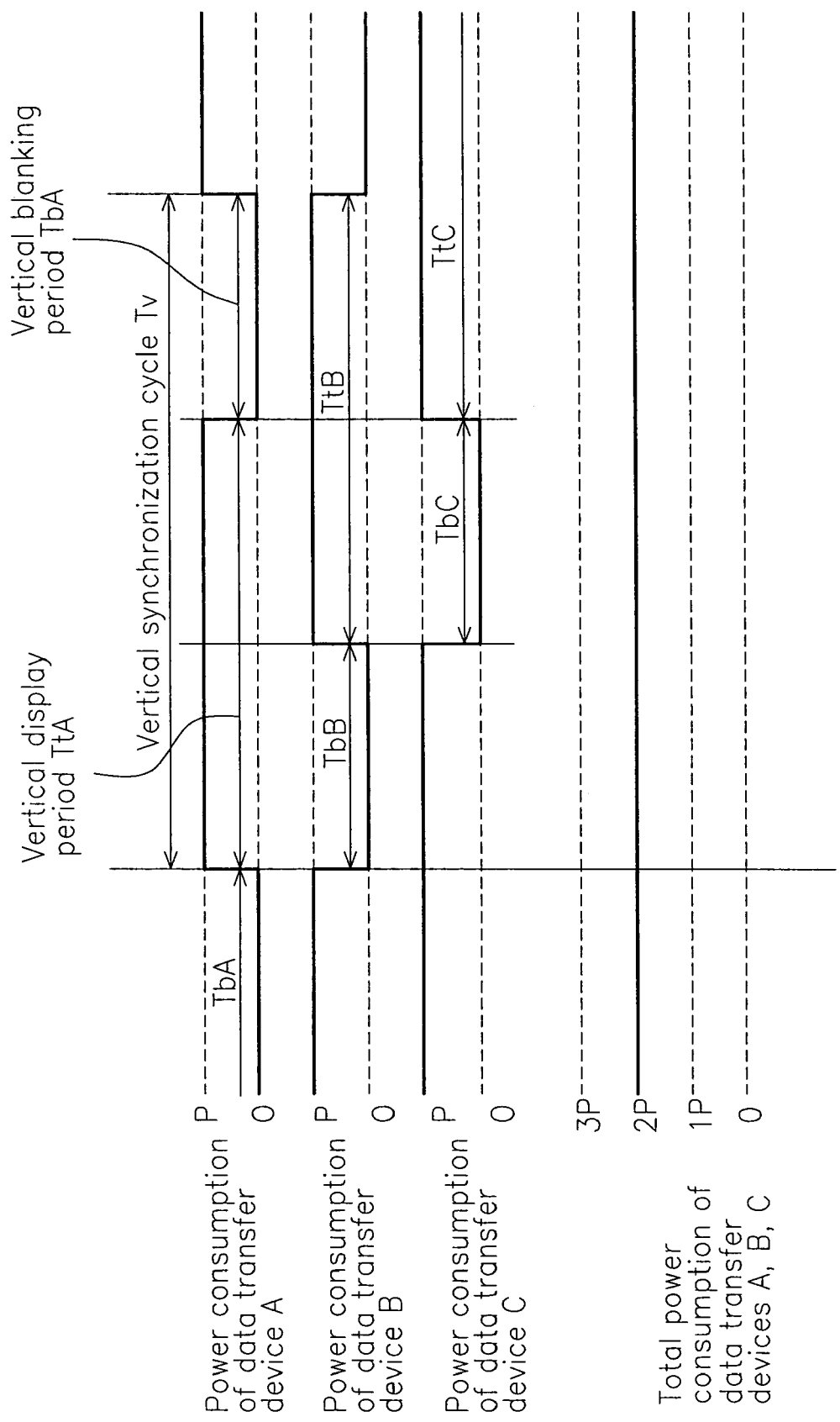
FIG. 4 is a timing chart of the power consumption by the data transfer devices using the vertical synchronization signals of the second embodiment.

FIG. 4 is a timing chart showing another example of transfer timing adjustment. Similar to the first embodiment, the cycles, vertical display periods, and vertical blanking period of the vertical synchronization signals A~C have the same length. In the present embodiment, the timing controller 12 adjusts the vertical blanking period of each vertical synchronization signal to ⅓ the length of the vertical synchronization signal cycle Tv. The adjustment of each vertical synchronization period by the timing controller 12 is such that none of the vertical blanking periods overlap another vertical blanking period of the vertical synchronization signals. Therefore, the vertical blanking period of one among the three vertical synchronization signals overlaps the vertical display period of the other two vertical synchronization signals. That is, the vertical blanking period Tb of each vertical synchronization signal is switched at each of three equal-length periods.

In this way one among the vertical synchronization signals A, B, C will normally be in the vertical blanking period state while the other two are in the vertical display period. Therefore, when the power consumed in data transfer by each data transfer device $3a\sim c$ is designated [P], the total power consumption of the data transfer devices $3a\sim c$ is normally 2×P. This time, the fluctuation range of the total power consumption of the data transfer devices $3a\sim c$ becomes [0].

According to the present embodiment, the periods during which the data transfer controller 1 stops data transfer to each display device are all staggered so as to not overlap. That is, one among the vertical synchronization signals stops data transfer. Therefore, when the power consumed in data transfer by each data transfer device $3a\sim c$ is designated [P], the total power consumption of the data transfer devices $3a\sim c$ is normally 2×P. Thus, the total power consumption of the data transfer devices 3a~c is reduced, and the fluctuation range of the total power consumption becomes [0], and noise in the transferred display data and noise in the power source of the data transfer devices 3a~c are reduced.

Moreover, although the present embodiment has been described in terms of three display devices, the embodiment is also applicable to N individual (where N is an integer, N≧2) display devices. In this case, the total power consumption for data transfer by the data transfer devices is normally (N−1)×P.

Furthermore, the adjustment timing of the vertical synchronization signals is not limited to the example of the present embodiment.

Third Embodiment (1) Structure (1-1) General Structure

Figure 5:
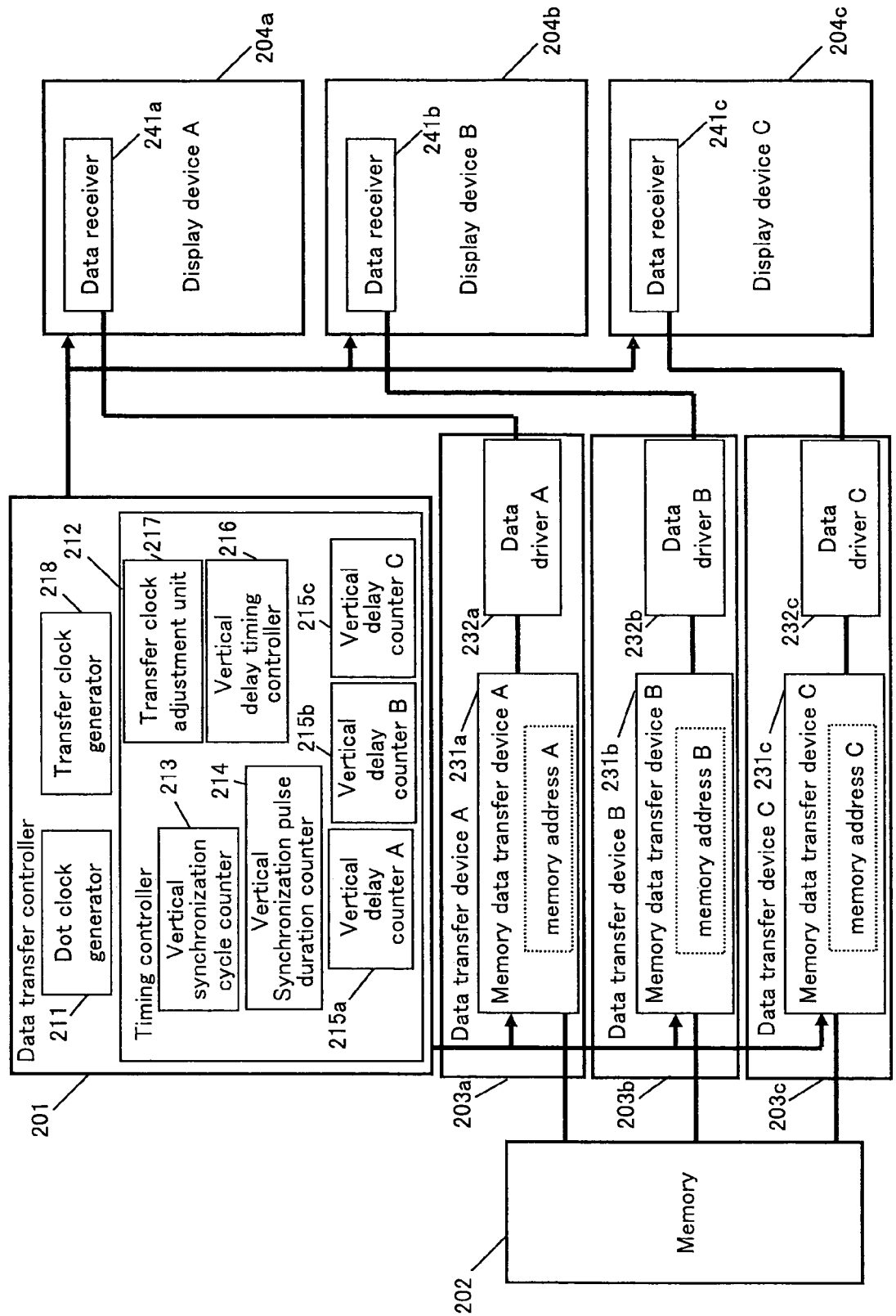
FIG. 5 is a structural diagram of the display data transfer system using the data transfer controller of the third embodiment.

FIG. 5 is a structural diagram of a display data transfer system using a data transfer controller of a third embodiment of the present invention. The display data transfer system of FIG. 5 is identical to the first embodiment. That is, the transfer system of FIG. 5 includes a data transfer controller 201, memory 202, data transfer devices 203a~c, and display devices 204a~c. FIG. 5 assumes three display devices.

The data transfer controller 201 individually adjusts the timings for transferring display data to each respective display device 204a~c. The memory 202 stores the display data displayed by the display devices 204a~c. The data transfer devices 203a~c transmit the respective display data to the display devices 204a~c based on vertical synchronization signals supplied from the data transmission device 201. The display devices 204a~c output the display data transferred from the data transfer devices 203a~c. More specifically, each of the display devices 204a~c has a respective data receiver 241a~c. Each data receiver 241a~c receives display data transferred from a data transfer device 203a~c, and supplies the data to a display driver (not shown in the drawing).

Although there are three display devices in the present embodiment, the present invention is not limited to this number inasmuch as any number of display devices may be used. In this case, the data transfer devices are provided in equal number to the number of display devices.

(1-2) Data Transfer Controller

The data transfer controller 201 further includes a transfer clock generator 218. The transfer clock generator 218 generates a transfer clock which defines the display data transfer speed corresponding to a single optional display device. In the present embodiment, a transfer clock is generated for the display device 204C. The data transfer controller 201 further includes a transfer clock adjustment unit 217 provided within the timing controller 212. The transfer clock adjustment unit 217 adjusts the frequency of the transfer clock such that no vertical blanking period of any display data transferred to a display device overlaps another vertical blanking period. Furthermore, the transfer clock adjustment unit 217 adjusts the frequency of the transfer clock based on the amount of display data and the condition of each display device. In this way the length of the vertical blanking period and vertical display period of each vertical synchronization signal can be essentially changed. This is described later in section (2) Transfer Clock.

Although the data transfer controller 201 includes a single transfer clock generator 218 in the present embodiment, there also may be a plurality of transfer clocks corresponding to the number of display devices. In this case, the transfer clock adjustment unit 217 adjusts the frequencies of the respective transfer clocks.

In this way the data transfer controller 201 of the present embodiment can adjust the speed at which display data are transferred, that is, the transfer clock, for each display device. Therefore, the present embodiment is applicable in cases when there is lengthy wiring from the data driver to the display device, and cases when display devices have different resolutions.

In other respects the structure of the data transfer controller 201 is identical to the first embodiment. That is, the data transfer controller 201 includes a dot clock generator 211, and a timing controller 212. The dot clock generator 211 generates a dot clock. The timing controller 212 supplies a vertical synchronization signal for each data transfer device 203a~c. The timing controller 212 adjusts each vertical synchronization signal such that all vertical synchronization signals supplied to the data transfer devices 203a~c are not simultaneous.

Specifically, the timing controller 212 includes a vertical synchronization cycle counter 213, vertical synchronization pulse duration counter 214, vertical delay counters 215a~c, and vertical delay timing controller 216. The vertical synchronization cycle counter 213 generates the cycle of the vertical synchronization signal of the display data. The vertical synchronization pulse duration counter 214 generates the display period, and blanking period of each vertical synchronization signal for a single optional display device.

The vertical delay counters 215a~c delay each vertical synchronization signal a predetermined period from a predetermined standard timing. This predetermined period is determined for each display device by the vertical delay timing controller 216. Specifically, the vertical delay counter 215a delays the standard timing by a predetermined period TdA. The vertical delay counter 215b delays the standard timing by a predetermined period TdB. The vertical delay counter 215c delays the standard timing by a predetermined period TdC.

The vertical delay timing controller 216 adjusts the delay time of each vertical synchronization signal. In the present embodiment, the delay time is adjusted such that the none of the vertical blanking periods overlaps another vertical blanking period among the display data transferred to the display devices. This is described in detail later in section (3) Vertical Synchronization Signal and Power Consumption.

In this way, the data transfer controller 201 adjusts the timing for the transfer of display data.

Although not shown in the drawing, the data transfer controller 201 further includes a horizontal synchronization cycle counter and horizontal synchronization pulse duration counter. The horizontal synchronization cycle counter generates the cycle of the horizontal synchronization signal for the display data. The horizontal synchronization pulse duration counter generates the horizontal display period and horizontal blanking period of each vertical synchronization signal.

(1-3) Data Transfer Device

The data transfer devices of the present embodiment are identical to the first embodiment. That is, the respective data transfer devices 203a~c include a respective memory data transfer device 231a~c, and data driver 232a~c. Each data transfer device 203a~c is provided for the associated display device 204a~c.

The memory data transfer devices 231a~c store memory addresses, and the display data are read from the memory 202 based on these memory addresses. The memory data transfer devices 231a~c transmit the read display data to the display devices 204a~c in accordance with the vertical synchronization signals from the timing controller 212.

The data drivers 232a~c drive the transfer data from the memory data transfer devices 231a~c to the display devices 204a~c.

(2) Transfer Clock

Figure 6:
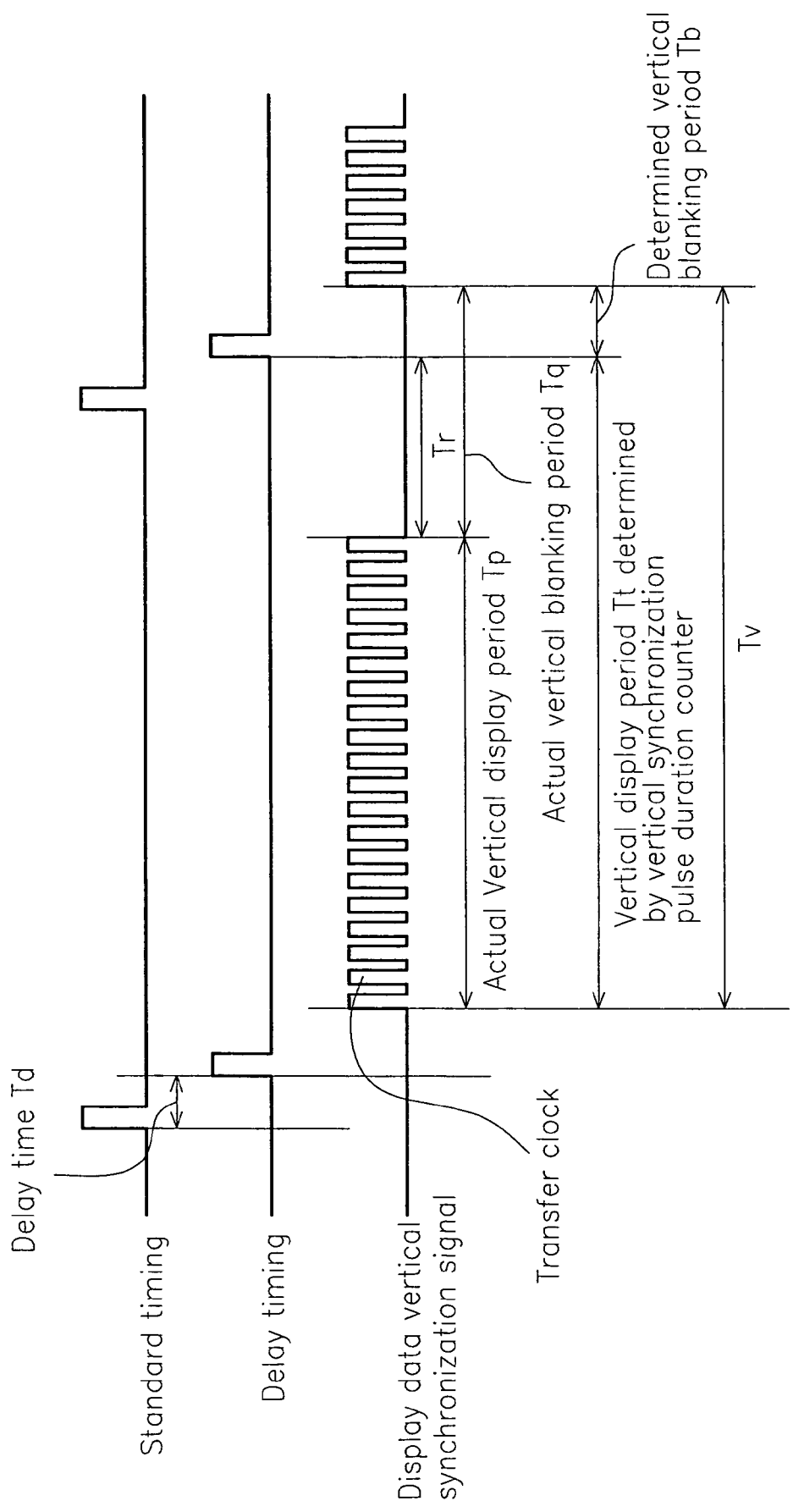
FIG. 6 illustrates the data transfer using the transfer clock.

How the transfer clock changes the vertical display period Tt and the vertical blanking period Tb is described below. FIG. 6 is a timing chart showing the standard timing, delay timing, and display data vertical synchronization signal timing.

The vertical synchronization pulse duration counter 214 generates a vertical display period and vertical blanking period based on the display device 204C. The transfer clock adjustment unit 217 adjusts the frequency of the transfer clock based on the condition of the display device 204C. The transfer clock is the display data transfer speed, and has a speed greater than the dot clock. The frequency of the transfer clock is determined by the resolution and length of the transmission path over which the display data are transferred. For example, when the display device has a high resolution, more display data are transferred. In this case, the transfer clock adjustment unit 217 increases the frequency of the transfer clock so as to transfer display data within the display period.

The display data transferred to the display device 204C is transferred within a vertical display period generated by the vertical synchronization pulse duration counter 214 simultaneously with the transfer clock frequency. During the vertical display period Tt generated by the vertical synchronization pulse duration counter 214, the remaining period Tr after display data transfer has ended is a time in which no display data transferred in this part of the vertical display period Tt. That is, the period Tr is essentially a part of the vertical blanking period. As a result, the actual vertical display period Tp is shorter than the vertical display period Tt determined by the vertical synchronization pulse duration counter 214 (Tp<Tt). Furthermore, the actual vertical blanking period Tq is longer than the vertical blanking period Tb determined by the vertical synchronization pulse duration counter 214 (Tq>Tb).

In this way the transfer clock adjustment unit adjusts the interval, that is the frequency, of the transfer lock to change the length of the vertical display time.

(3) Vertical Synchronization Signal and Power Consumption

Figure 7:
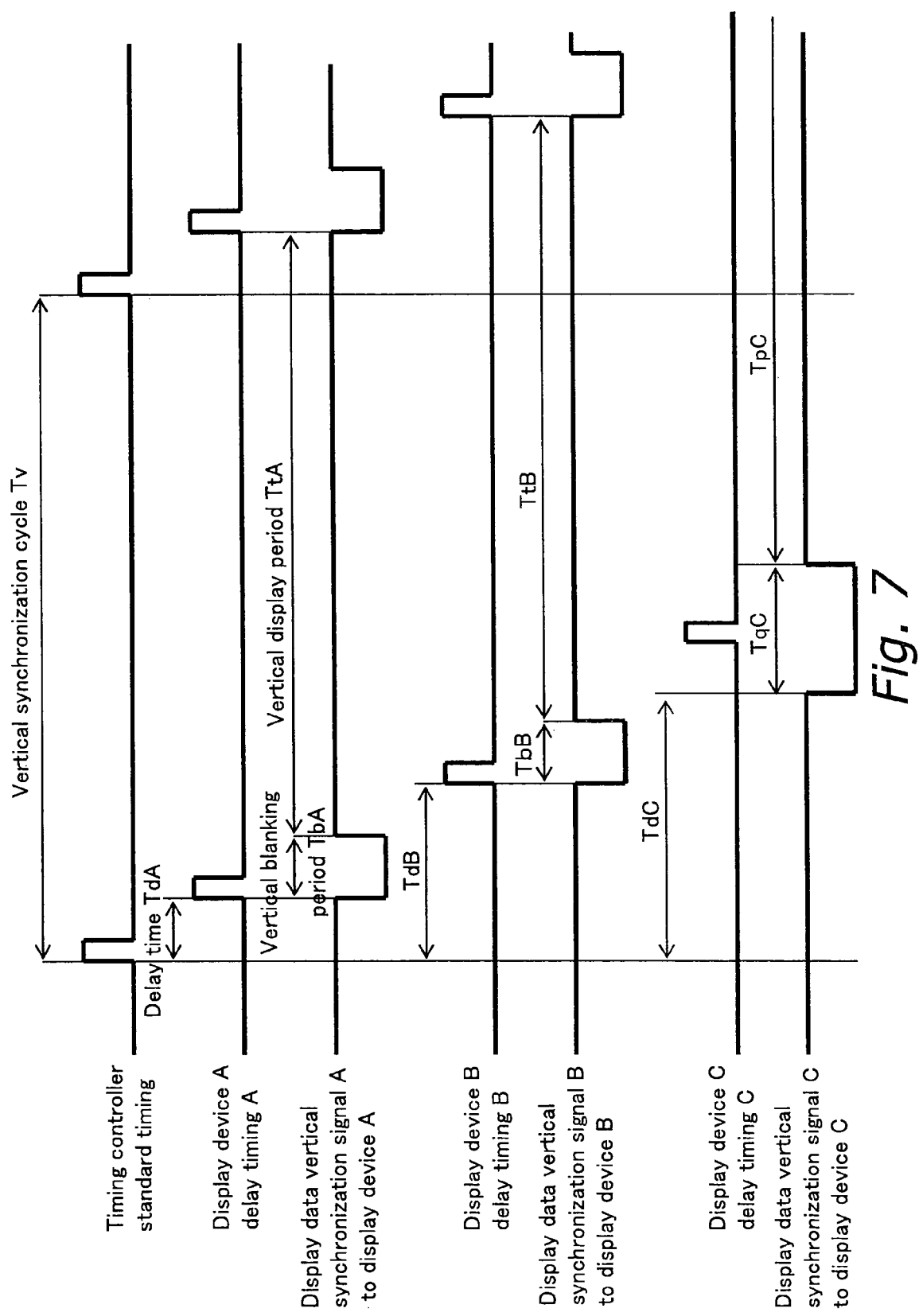
FIG. 7 is a timing chart of the vertical synchronization signals of the third embodiment.

FIG. 7 is a timing chart showing the display data transfer timing in the transfer system of FIG. 5. The vertical synchronization signals respectively supplied to the data transfer devices 203a~c are shown as vertical synchronization signal A~C. In the present embodiment, the cycles of the vertical synchronization signals A~C are identical in length. Furthermore, although the vertical display periods and vertical blanking periods of the vertical synchronization signals A and B are identical in length, the vertical display period and vertical blanking period of the vertical synchronization signal C have a different length than the vertical synchronization signals A and B. Specifically, the transfer clock adjustment unit 217 adjusts the transfer clock for transferring display data to the display device C so as to have a higher frequency than the transfer clocks for transferring display data to the display devices A and B. Therefore, the length of the vertical display period TpC of the vertical synchronization signal C is shorter than the vertical display periods TtA and TtB of the vertical synchronization signals A and B.

The vertical synchronization signal A is delayed by a time TdA from a predetermined standard timing. The vertical synchronization signal B is delayed a time TdB from a predetermined standard timing. The vertical synchronization signal C is delayed a time TdC from a standard timing. The delay times establish the relationship TdA<TdB<TdC. In this case, when the delay time TdA has elapsed after the standard timing, the vertical blanking period TbA of the vertical synchronization signal A starts. When the delay time TdB has elapsed after the standard timing, the vertical blanking period TbB of the vertical synchronization signal B starts. In regard to the vertical synchronization signal C, a vertical blanking period TqC extends before and after the delay time TdC elapses after the standard timing.

Furthermore, the combined length of the delay time TdA and vertical blanking period TbA is shorter than the delay time TdB (TdA+TbA<TdB). The combined length of the delay time TdB and vertical blanking period TbB is shorter than the delay time TdC (TdB+TbB<TdC). The combined length of the delay time TdC and vertical blanking period TqC is shorter than the combined length of the delay time TdA and the vertical synchronization cycle Tv (TdC+TqC<TdA+Tv). The vertical blanking period TbA of the vertical synchronization signal A overlaps the vertical display periods TtB and TpC of the vertical synchronization signals B and C. The vertical blanking period TbB of the vertical synchronization signal B overlaps the vertical display periods TtA and TpC of the vertical synchronization signals A and C. The vertical blanking period TqC of the vertical synchronization signal C overlaps the vertical display periods TtA and TtB of the vertical synchronization signals A and B.

Figure 8:
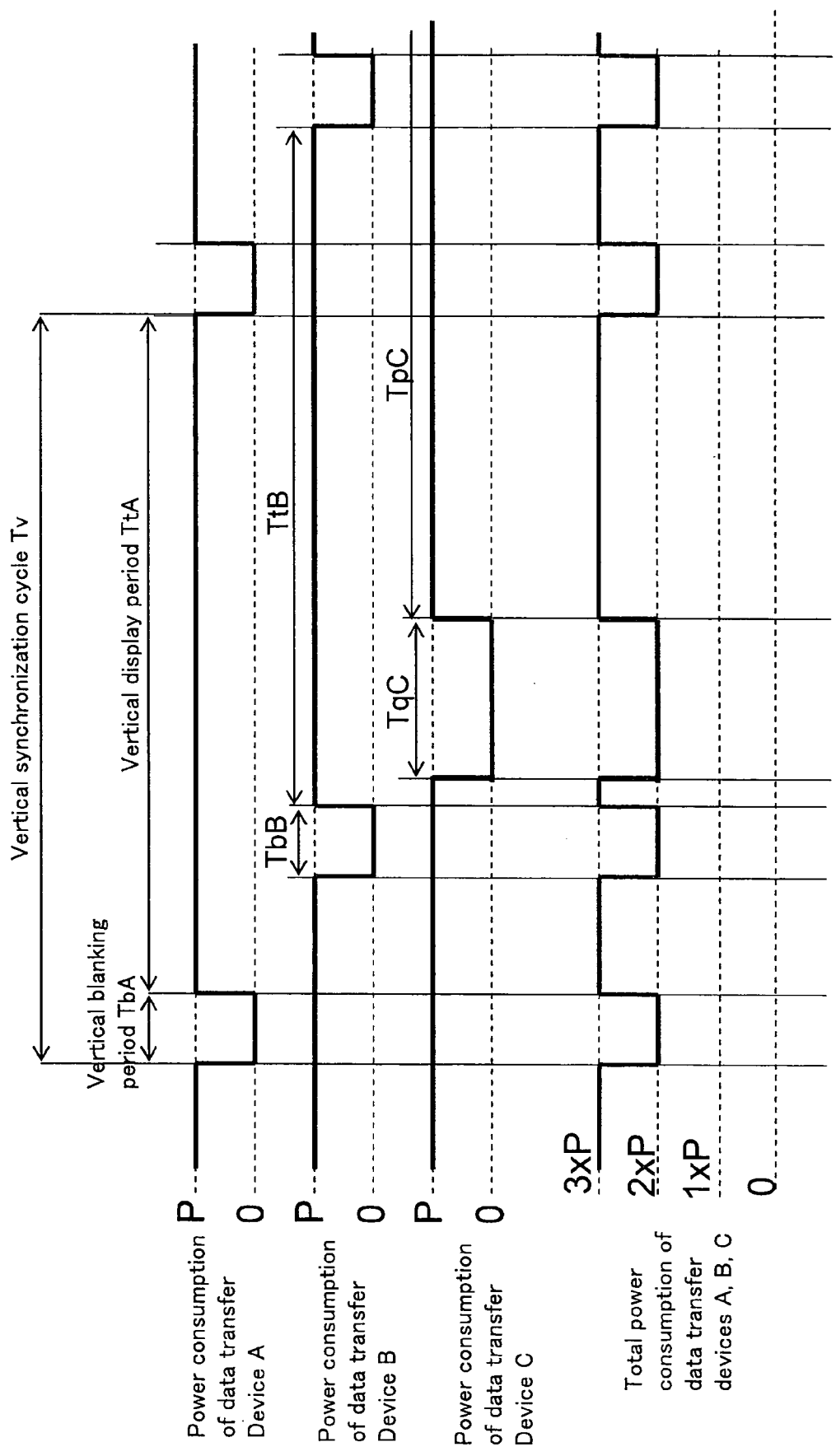
FIG. 8 is a timing chart of the power consumption by the data transfer devices using the vertical synchronization signals of the third embodiment.

FIG. 8 is a timing chart of power consumption by the data transfer devices 203a~c when the vertical blanking periods are adjusted as shown in FIG. 7. In the respective vertical display periods TtA~TpC, the data transfer devices 203a~c respectively consume power [P] to transfer data to the display devices 204a~c. In the respective vertical blanking periods TbA~TqC, the data transfer devices 203a~c respectively consume power [0] because the data transfer is stopped.

Therefore, the total power consumed for data transfer by the data transfer devices 203a~c, that is, the total power consumption of the data transfer devices 203a~c, changes in a range of 3×P to 2×P. Specifically, in the blanking period Tb of any one vertical synchronization signal, the total power consumption of the data transfer devices 203a~c is 2×P, and in the vertical display period Tt of all vertical synchronization signals, the total power consumption of the data transfer devices 203a~c is 3×P.

In the present embodiment, therefore, the maximum total power consumption of the data transfer devices becomes 3×P, and the minimum total power consumption becomes 2×P. The difference between the maximum and minimum total power consumption, that is, the fluctuation range, becomes 3×P−2×P=1×P.

According to the present embodiment, the transfer clock adjustment unit adjusts the frequency of the transfer clock in accordance with the condition and environment of the display device. The display data is transferred by the transfer clock so that the vertical display period can be changed by the transfer clock. Furthermore, it is possible to avoid generating periods in which all data transfer devices simultaneously stop data transfer to the display devices. Thus, when the power consumed in data transfer by each data transfer device is designated [P], the fluctuation range of the total power consumption for data transfer is reduced from 3×P to 1×P. Therefore, the power consumption of each data transfer device is reduced, and noise in the transferred display data and noise in the power source of the data transfer devices are reduced.

Although the present embodiment has been described in terms of three display devices, the present invention is applicable to N individual (where N is an integer, N≧2) display devices. In this case, the fluctuation range of the total power consumption of the data transfer devices is reduced from N×P to 1×P.

Furthermore, the adjustment timing of the vertical synchronization signal is not limited to the example of the present embodiment.

Fourth Embodiment

The structure of the data transfer controller of the present embodiment and the transfer system using this data transfer controller is identical to the third embodiment.

(1) Vertical Synchronization Signal and Power Consumption

Figure 9:
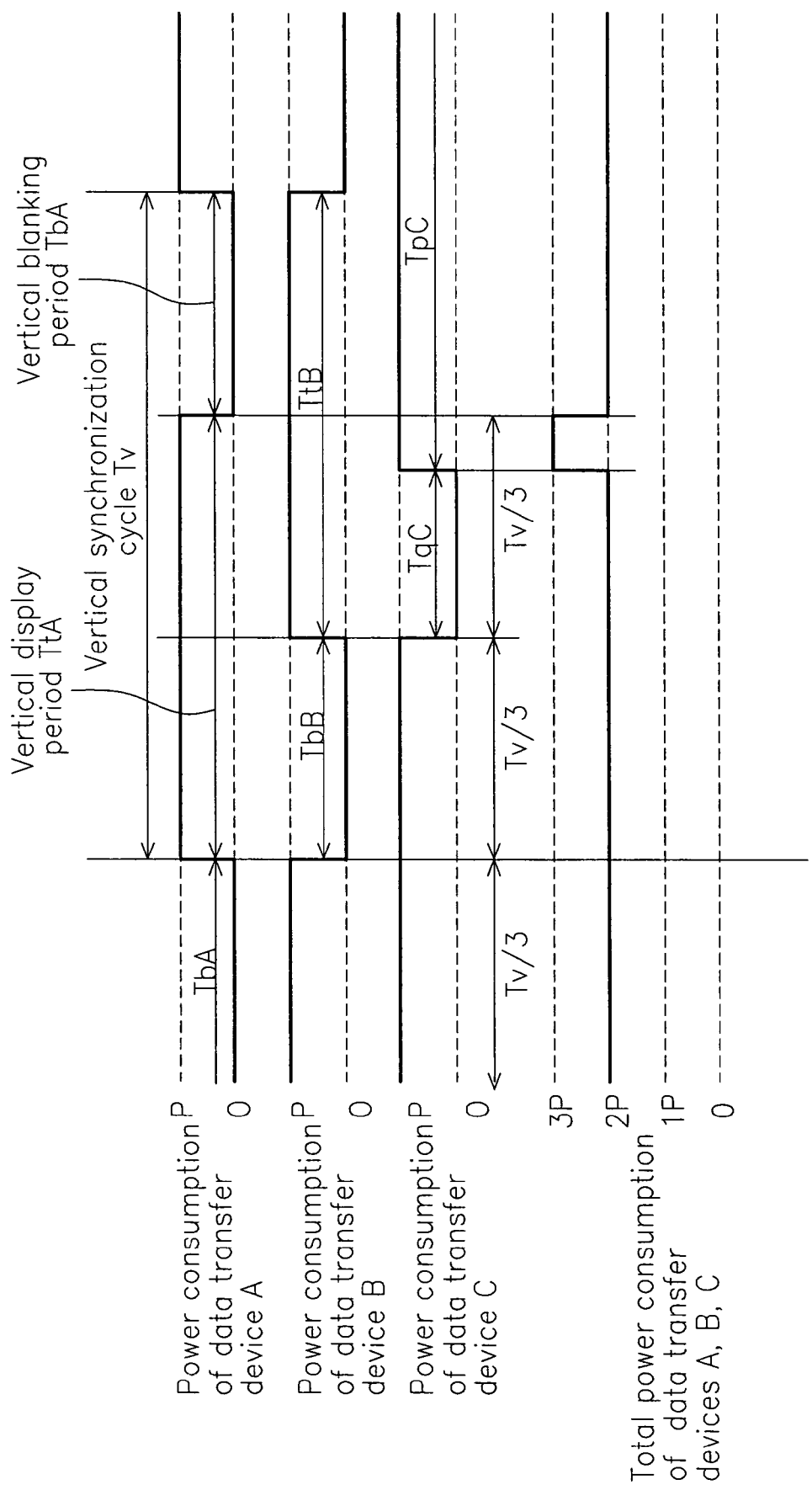
FIG. 9 is a timing chart of the power consumption by the data transfer devices using the vertical synchronization signals of the fourth embodiment.

FIG. 9 is a timing chart showing another example of the transfer timing adjustment. Similar to the third embodiment, the cycles of the vertical synchronization signals A~C are identical in length. Furthermore, although the vertical display periods and vertical blanking periods of the vertical synchronization signals A and B are identical in length, the vertical display period and vertical blanking period of the vertical synchronization signal C have a different length than the vertical synchronization signals A and B. Specifically, the transfer clock adjustment unit 217 adjusts the transfer clock for transferring display data to the display device C so as to have a lower frequency than the transfer clocks for transferring display data to the display devices A and B. Therefore, the length of the vertical display period TpC of the vertical synchronization signal C is longer than the vertical display periods TtA and TtB of the vertical synchronization signals A and B, and the vertical blanking period TqC of the vertical synchronization signal C is shorter than the vertical blanking periods TbA and TbB of the vertical synchronization signals A and B.

In the present embodiment, the transfer clock adjustment unit 217 adjusts the frequency of the transfer clock such that the vertical blanking period of the display data transferred to each display device 204a~c does not exceed the period Tv/3, which is ⅓ of the cycle Tv obtained by dividing the respective lengths of the display data vertical blanking period into three equal parts, and is switched each Tv/3.

Details are described below. In the case of the period Tv/3 of the vertical synchronization signal A, the vertical blanking period Tba of the vertical synchronization signal A overlaps the vertical display periods TtB and TpC of the vertical synchronization signals B and C. In the case of the period Tv/3 of the vertical synchronization signal B, the vertical blanking period TbB of the vertical synchronization signal B overlaps the vertical display periods TtA and TpC of the vertical synchronization signals A and C.

In the case of the period Tv/3 of the vertical synchronization signal C, the vertical blanking period TqC of the vertical synchronization signal C overlaps the vertical display periods TtA and TtB of the vertical synchronization signals A and B, and part of the vertical display period TpC of the vertical synchronization signal C overlaps the vertical display periods TtA and TtB of the vertical synchronization signals A and B.

In this way, in the present embodiment, one among the vertical synchronization signals A, B, C is in a vertical blanking period and two are in a vertical display period, or three are in a vertical display period. Thus, when the power consumed by each data transfer device 203a~c in transferring display data is designated [P], the fluctuation range of the total power consumption of the data transfer devices 203a~c changes within a range from 2×P to 3×P. Specifically, when one among the vertical synchronization signals is in a vertical blanking period, the total power consumption of the data transfer devices is 2×P, and when all vertical synchronization signals are in the vertical display periods, the total power consumption of the data transfer devices is 3×P. The difference between the maximum and minimum values of total power consumption, that is, the fluctuation range, is 3×P−2×P=1×P.

According to the present embodiment, the transfer clock adjustment unit adjusts the frequency of the transfer clock in accordance with the condition and environment of the display device. The display data is transferred by the transfer clock so that the vertical display period can be changed for each display device by the transfer clock. Furthermore, it is possible to avoid generating periods in which all data transfer devices simultaneously stop data transfer to the display devices. Thus, when the power consumed in data transfer by each data transfer device is designated [P], the fluctuation range of the total power consumption for data transfer is reduced from 3×P to 1×P. Therefore, the power consumption of each data transfer device is reduced, and noise in the transferred display data and noise in the power source of the data transfer devices are reduced.

Although the present embodiment has been described in terms of three display devices, the present invention is applicable to N individual (where N is an integer, N≧2) display devices. In this case, the fluctuation range of the total power consumption of the data transfer devices is reduced from N×P to 1×P.

Furthermore, the adjustment timing of the vertical synchronization signals is not limited to the example of this embodiment.

Although the cycles of the vertical synchronization signals are equal in all display devices, the present invention is not limited to this arrangement. That is, the cycles of the vertical synchronization signals may be different for each display device.

Furthermore, the present invention is not limited to the described timings and sequences inasmuch as various timings and sequences may be used insofar as all vertical blanking periods of the vertical synchronization signals do not overlap, or all vertical display periods do not overlap.

Figure 10:
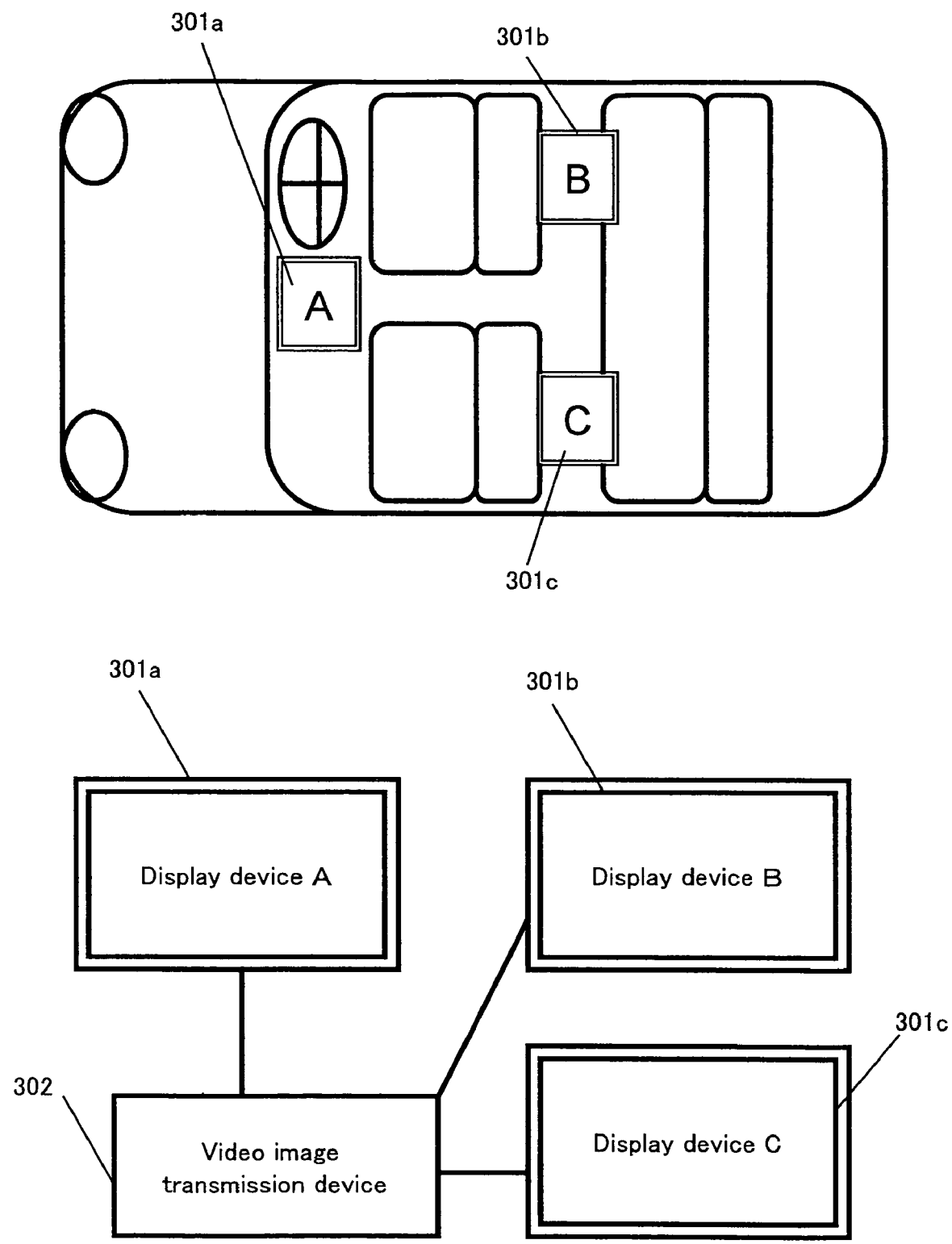
FIG. 10 is an illustration of a mobile on-board video image transmission device.
Figure 11:
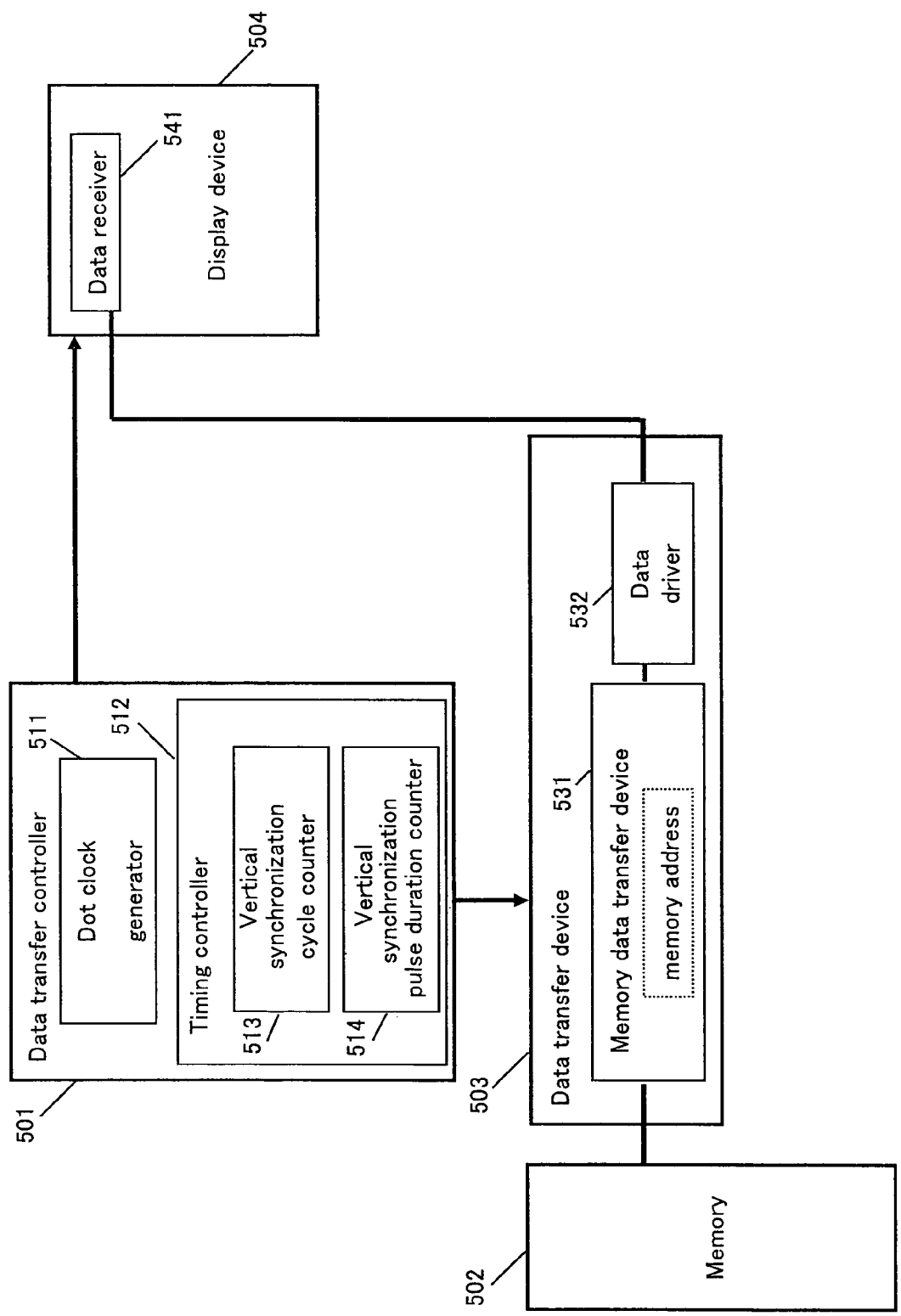
FIG. 11 is a structural diagram of a display data transfer system using one display device and data transfer controller.
Figure 12:
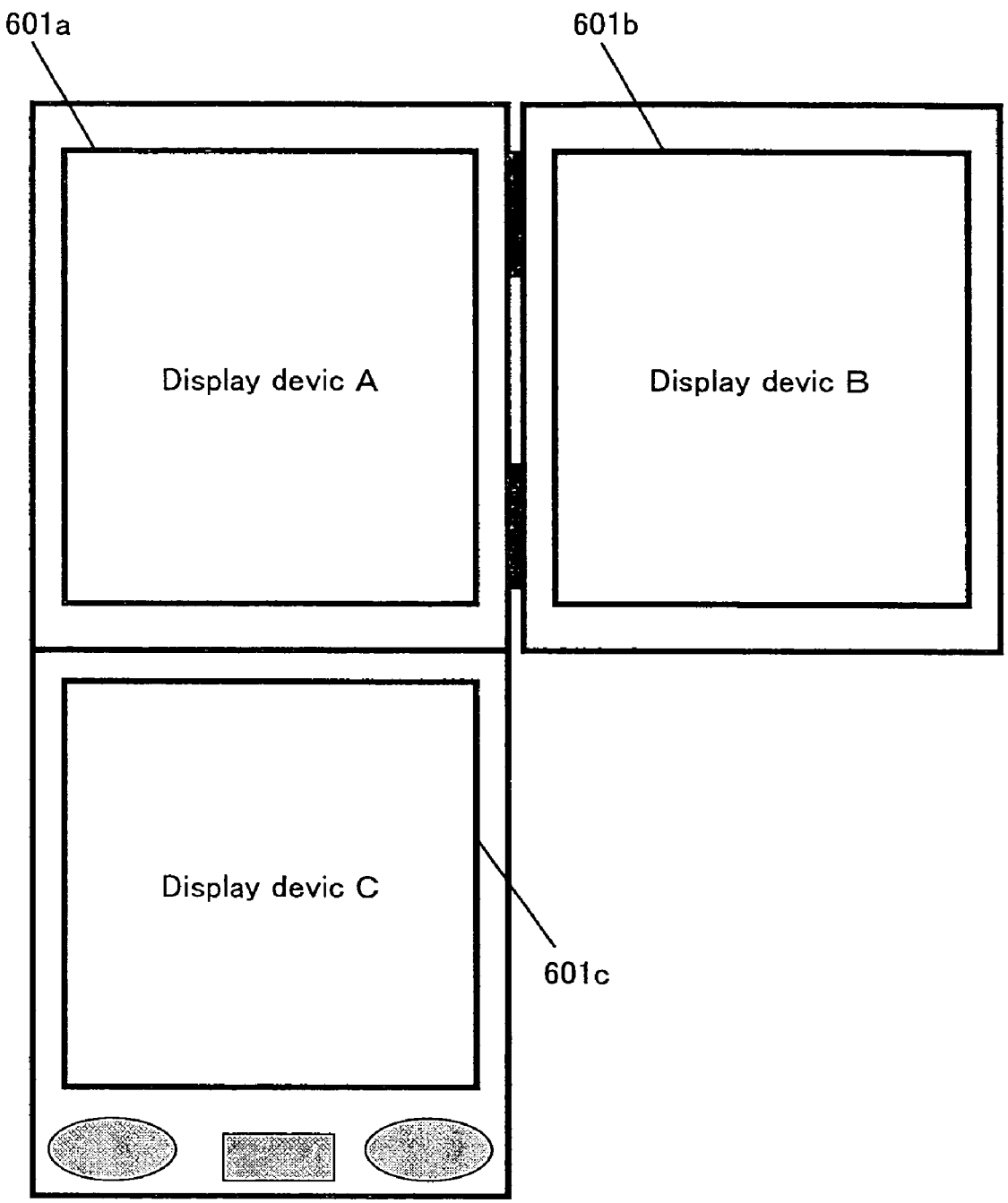
FIG. 12 is a diagram of an electronic device including a plurality of display devices.
Figure 13:
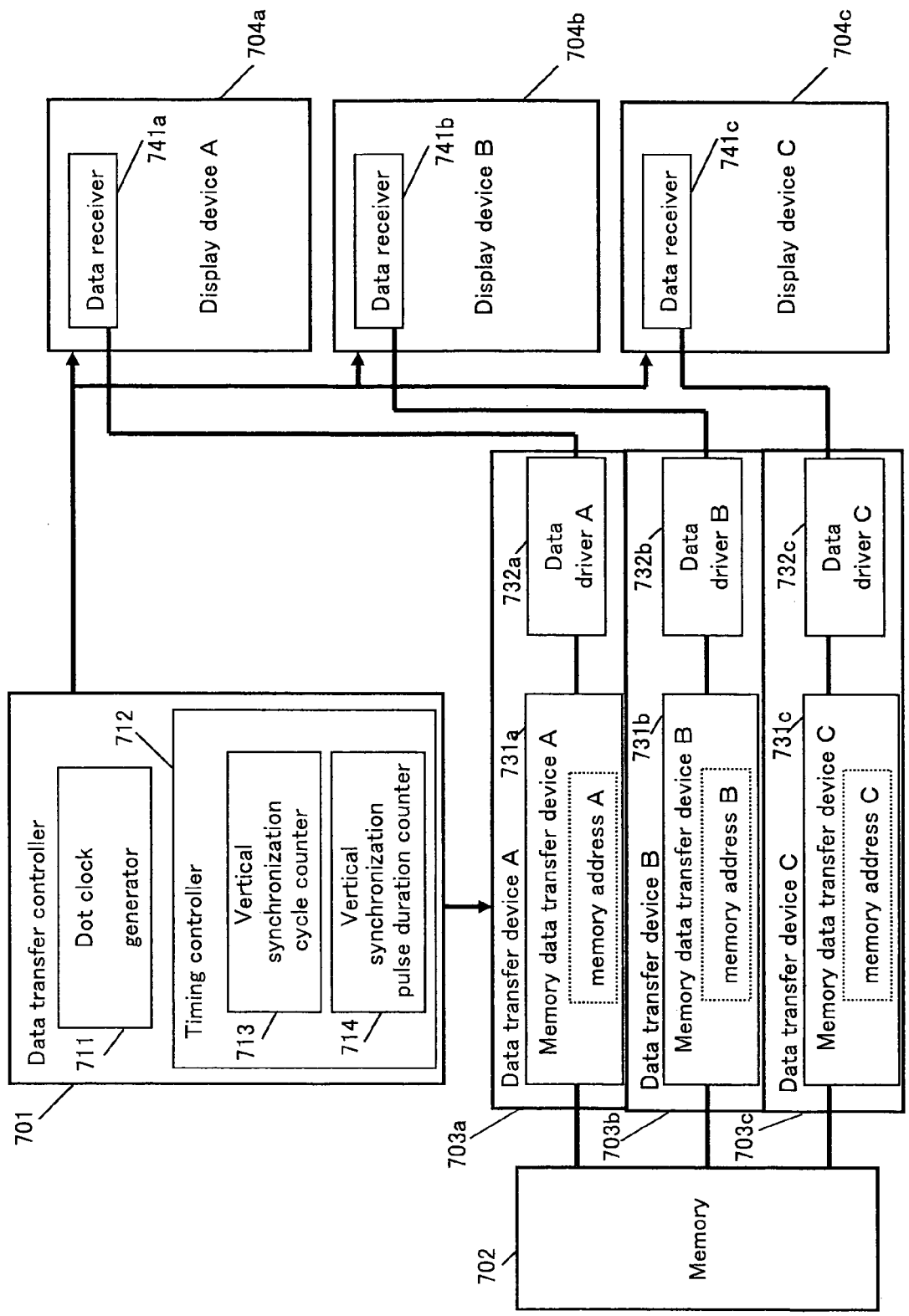
FIG. 13 is a structural diagram of a display data transfer system using a plurality of display divides and a data transfer controller.
Figure 14:
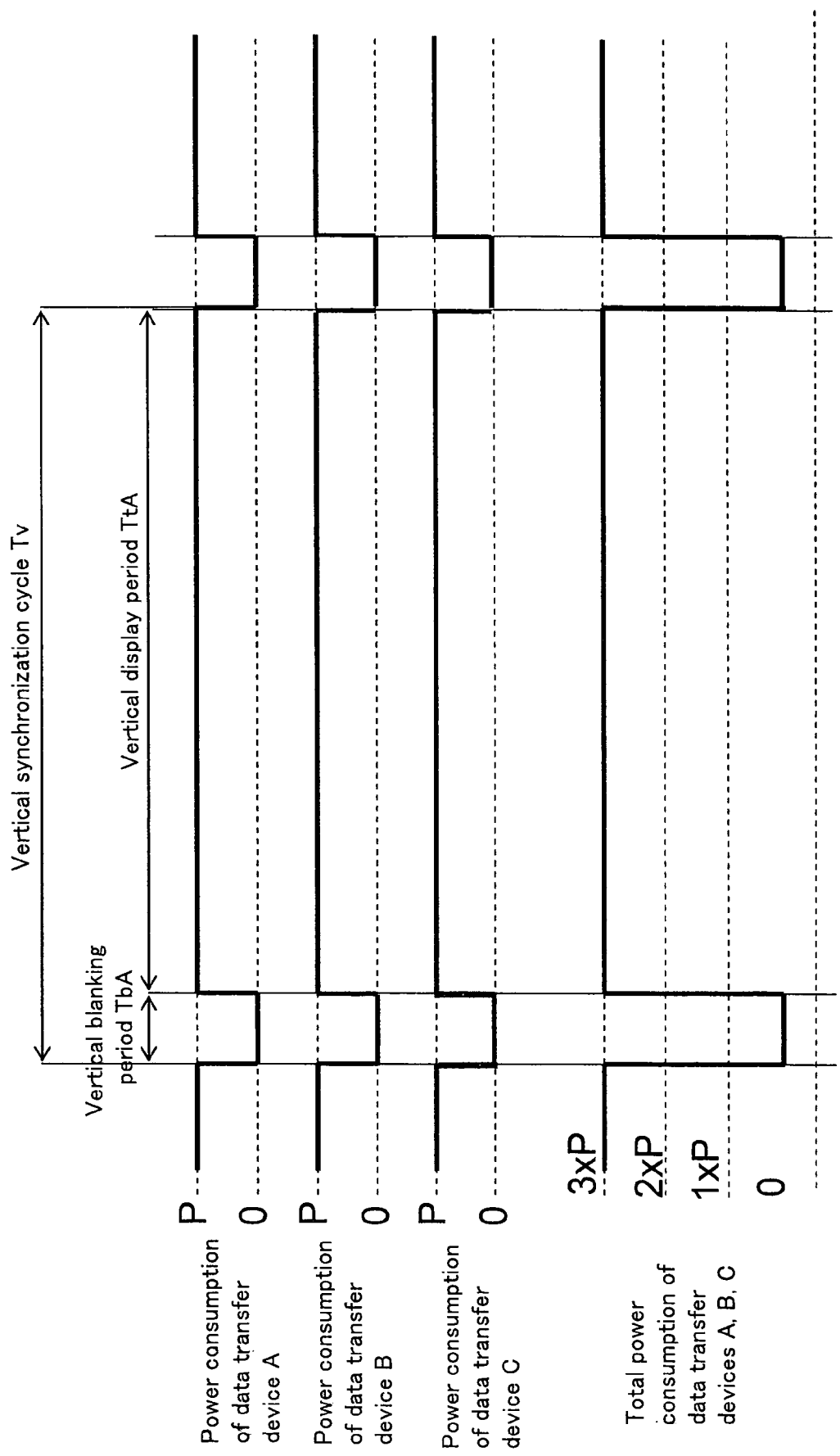
FIG. 14 is a timing chart of the power consumption of the data transfer device having the structure shown in FIG. 13.

The present invention is effective when display data are transferred to a plurality of display devices. The invention is particularly applicable to mobile on-board video image transmission devices. FIG. 10 shows a plurality of display devices 301a~c connected to a mobile on-board video image transmission device 302. The video image transmission device 302 includes the data transfer controller of the present invention, transfer units for transferring display data based on control signals generated by the data transfer controller, and memory for storing the display data. The data transfer controller of the present invention suppresses fluctuation in power consumption of the transfer devices which transfer display data to the display devices. Therefore, noise is suppressed in the transferred display data. Accordingly, the data transfer controller of the present invention is applicable to image transfer devices such as AV devices installed in automobiles. In this way noise in the image data does not adversely affect, for example, the engine and braking systems, and safety is enhanced.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A data transfer controller for controlling the timing for transferring display data to N individual (where N is an integer $N \geq 2$) display devices, the data transfer controller comprising:
a clock signal generating unit configured to generate clock signals; and
a timing control unit configured to adjust the timing of a vertical synchronization signal included in the display data for each N individual display devices based on the clock signal;
wherein the timing control unit adjusts the timing of the vertical synchronization signals such that no vertical blanking period overlaps any other vertical blanking period, or adjusts the timing of the vertical synchronization signals such that no vertical display period overlaps a vertical display period of another display device among the display data transferred to each display device.

2. The data transfer controller of claim 1, wherein the timing control unit adjusts the timing of the vertical synchronization signals such that no vertical blanking period overlaps any other vertical blanking period, and no vertical display period overlaps a vertical display period of another display device among the display data transferred to each display device.

3. The data transfer controller of claim 1, wherein the timing control unit adjusts the timing of the vertical synchronization signal so as to switch the vertical blanking period of the display data transferred to each display device each period T/N obtained by dividing the cycle T of the vertical synchronization signal of the display data into N equal parts.

4. The data transfer controller of claim 1 further comprising:
a transfer clock generating unit configured to generate a transfer clock which defines the display data transfer speed.

5. The data transfer controller of claim 4 further comprising a transfer clock adjusting unit configured to adjust a frequency of the transfer clock such that no vertical blanking period overlaps any other vertical blanking period among the display data transferred to each display device.

6. The data transfer controller of claim 4 further comprising:
a transfer clock adjusting unit configured to adjust a frequency of the transfer clock such that the vertical blanking period of the display data transferred to each display device is switched each period T/N, and the respective lengths of the vertical blanking periods do not exceed the period T/N obtained by dividing the cycle Tv of the vertical synchronization signal of the display data into N equal parts.

7. A mobile on-board video image transmission device connected to a display device, the video image transmission device comprising:
the data transfer controller of claim 1;
a transmission unit configured to transmit display data based on control signals generated by the data transfer controller; and
a memory unit storing the display data.

8. The data transfer controller of claim 2, wherein the timing control unit adjusts the timing of the vertical synchronization signal so as to switch the vertical blanking period of the display data transferred to each display device each period T/N obtained by dividing the cycle T of the vertical synchronization signal of the display data into N equal parts.

* * * * *